United States Patent
He et al.

(10) Patent No.: US 11,410,407 B2
(45) Date of Patent: Aug. 9, 2022

(54) METHOD AND DEVICE FOR GENERATING COLLECTION OF INCORRECTLY-ANSWERED QUESTIONS

(71) Applicant: Hangzhou Dana Technology Inc., Zhejiang (CN)

(72) Inventors: Tao He, Zhejiang (CN); Lihui Mao, Zhejiang (CN); Huan Luo, Zhejiang (CN); Mingquan Chen, Zhejiang (CN)

(73) Assignee: Hangzhou Dana Technology Inc., Zhejiang (CN)

( * ) Notice: Subject to any disclaimer, the term of this patent is extended or adjusted under 35 U.S.C. 154(b) by 0 days.

(21) Appl. No.: 17/418,238

(22) PCT Filed: Dec. 25, 2019

(86) PCT No.: PCT/CN2019/128160
§ 371 (c)(1),
(2) Date: Jun. 24, 2021

(87) PCT Pub. No.: WO2020/135472
PCT Pub. Date: Jul. 2, 2020

(65) Prior Publication Data
US 2022/0067416 A1 Mar. 3, 2022

(30) Foreign Application Priority Data
Dec. 26, 2018 (CN) .......................... 201811603491.3

(51) Int. Cl.
*G06V 10/22* (2022.01)
*G06F 16/35* (2019.01)
(Continued)

(52) U.S. Cl.
CPC ........ *G06V 10/225* (2022.01); *G06F 16/3329* (2019.01); *G06F 16/35* (2019.01); *G06V 10/751* (2022.01)

(58) Field of Classification Search
CPC .......... G06K 19/06075; G06K 9/6262; G06K 9/6263; G06V 30/10; G06V 30/40;
(Continued)

(56) References Cited

U.S. PATENT DOCUMENTS

| 7,286,793 | B1 * | 10/2007 | Miele | ....................... | G09B 7/00 |
| | | | | | 434/323 |
| 8,336,779 | B1 * | 12/2012 | Porter | ................... | G06V 30/412 |
| | | | | | 235/462.1 |

(Continued)

FOREIGN PATENT DOCUMENTS

| CN | 101916327 | 12/2010 |
| CN | 104794948 | 7/2015 |

(Continued)

OTHER PUBLICATIONS

"International Search Report (Form PCT/ISA/210) of PCT/CN2019/128160," dated Mar. 23, 2020, with English translation thereof, pp. 1-4.

*Primary Examiner* — Ian L Lemieux
(74) *Attorney, Agent, or Firm* — JCIP Global Inc.

(57) ABSTRACT

A method and a device for generating a collection of incorrectly-answered questions are provided. The method includes: acquiring an image of a marked test paper (S101); recognizing regions of respective questions in the marked test paper according to a pre-trained first region recognition model (S102); recognizing a question whose marking result is incorrect in the marked test paper as an incorrectly-answered question according to a pre-trained incorrectly-answered question recognition model (S103); and storing the region of the incorrectly-answered question in an incorrectly-answered question database to generate the collection of incorrectly-answered questions (S104). The above solution may solve the problem of low efficiency in generating (Continued)

the collection of incorrectly-answered questions in the prior art.

11 Claims, 2 Drawing Sheets

(51) Int. Cl.
*G06F 16/332* (2019.01)
*G06V 10/75* (2022.01)

(58) Field of Classification Search
CPC .... G06V 30/224; G06V 30/153; G06V 10/98; G06V 10/82; G06V 30/418; G06V 30/245; G06V 10/225; G06V 10/751; G06V 30/412; G06V 30/1448; G06F 40/279; G06F 40/56; G06F 16/5846; G06F 16/3329; G06F 16/35; G06Q 10/10; G06Q 40/00; G09B 7/00; G09B 3/00
See application file for complete search history.

(56) References Cited

U.S. PATENT DOCUMENTS

| | | | | |
|---|---|---|---|---|
| 10,977,513 | B2* | 4/2021 | Xu | G06V 30/1478 |
| 2002/0176598 | A1* | 11/2002 | Knowles | G06Q 10/10 |
| | | | | 382/100 |
| 2003/0020963 | A1* | 1/2003 | Currans | H04N 1/33315 |
| | | | | 358/406 |
| 2003/0224340 | A1* | 12/2003 | Housman | G09B 7/00 |
| | | | | 434/353 |
| 2006/0160054 | A1* | 7/2006 | Onishi | G09B 7/02 |
| | | | | 434/362 |
| 2006/0252023 | A1* | 11/2006 | Cui | G09B 7/06 |
| | | | | 434/353 |
| 2007/0031802 | A1* | 2/2007 | Koyama | G09B 7/06 |
| | | | | 434/323 |
| 2007/0048718 | A1* | 3/2007 | Gruenstein | G09B 7/06 |
| | | | | 434/322 |
| 2009/0226872 | A1* | 9/2009 | Gunther | G09B 7/00 |
| | | | | 434/350 |
| 2010/0159437 | A1* | 6/2010 | German | G09B 7/02 |
| | | | | 707/E17.046 |
| 2015/0187219 | A1* | 7/2015 | Sheppard | G09B 3/06 |
| | | | | 434/354 |
| 2017/0262738 | A1* | 9/2017 | Hu | G06V 30/15 |
| 2019/0370672 | A1* | 12/2019 | Funderburk | G06N 5/04 |
| 2020/0159820 | A1* | 5/2020 | Rodriguez | G06F 40/103 |
| 2020/0286402 | A1* | 9/2020 | He | G06V 30/274 |

FOREIGN PATENT DOCUMENTS

| | | |
|---|---|---|
| CN | 105095892 | 11/2015 |
| CN | 106897749 | 6/2017 |
| CN | 107784264 | 3/2018 |
| CN | 108932508 | 12/2018 |
| CN | 109710590 | 5/2019 |

* cited by examiner

METHOD AND DEVICE FOR GENERATING COLLECTION OF INCORRECTLY-ANSWERED QUESTIONS

CROSS-REFERENCE TO RELATED APPLICATION

This application is a 371 of international application of PCT application serial no. PCT/CN2019/128160, filed on Dec. 25, 2019, which claims the priority benefit of China application no. 201811603491.3, filed on Dec. 26, 2018. The entirety of each of the above mentioned patent applications is hereby incorporated by reference herein and made a part of this specification.

BACKGROUND

Technical Field

The disclosure relates to the technical field of teaching and information processing, and in particular to a method and a device for generating a collection of incorrectly-answered questions, an electronic apparatus, and a computer-readable storage medium.

Description of Related Art

The collection of incorrectly-answered questions helps the student to quickly master weak knowledge points, optimize learning paths, and review. At present, students usually copy incorrectly-answered questions into notebooks by handwriting to create their own collections of incorrectly-answered questions. This way of generating the collection of incorrectly-answered questions is less efficient, and students may be unwilling to spend time and energy on handwriting incorrectly-answered questions, thereby affecting study and grades of students.

SUMMARY

The objective of the disclosure is to provide a method and a device for generating a collection of incorrectly-answered questions, an electronic apparatus, and a computer-readable storage medium to solve the problem of low efficiency in generating the collection of incorrectly-answered questions in the prior art.

In order to achieve the objective, the disclosure provides a method for generating a collection of incorrectly-answered questions. The method includes the following. An image of a marked test paper is acquired. Regions of respective questions in the marked test paper are recognized according to a pre-trained first region recognition model. A question whose marking result is incorrect in the marked test paper is recognized as an incorrectly-answered question according to a pre-trained incorrectly-answered question recognition model. The region of the incorrectly-answered question is stored in an incorrectly-answered question database to generate the collection of incorrectly-answered questions.

Optionally, recognizing the question whose marking result is incorrect in the marked test paper as the incorrectly-answered question according to the pre-trained incorrectly-answered question recognition model includes: recognizing marking symbols in the regions of respective questions are recognized according to the pre-trained incorrectly-answered question recognition model, and determining a question whose marking symbol is a preset symbol as the question whose marking result is incorrect.

Optionally, recognizing the marking symbols in the regions of respective questions includes: performing binarization processing on images corresponding to the regions of respective questions, and recognizing the marking symbols in the regions of respective questions according to a pixel value range obtained by the binarization processing.

Optionally, the method further includes: recognizing an answer region and/or a marking region of the incorrectly-answered question according to a pre-trained second region recognition model. Storing the region of the incorrectly-answered question in the incorrectly-answered question database includes: performing covering processing on the answer region and/or the marking region of the incorrectly-answered question, and storing the region of the incorrectly-answered question after the covering processing in the incorrectly-answered question database.

Optionally, the method further includes: recognizing a character in the answer region of the incorrectly-answered question according to a pre-trained character recognition model, and storing a recognized incorrect answer in the incorrectly-answered question database and associating the recognized incorrect answer with the incorrectly-answered question.

Optionally, the method further includes: storing at least one of a test paper identifier (ID), a reason for being incorrect, and an assessment knowledge point corresponding to the incorrectly-answered question in the incorrectly-answered question database and associating at least one of the test paper ID, the reason for being incorrect, and the assessment knowledge point with the incorrectly-answered question.

Optionally, the method further includes recognizing a question type of the incorrectly-answered question. Storing the region of the incorrectly-answered question in the incorrectly-answered question database includes: storing the region of the incorrectly-answered question in a corresponding question type group in the incorrectly-answered question database.

Optionally, the method further includes: searching a question corresponding to the incorrectly-answered question in a question bank to acquire a standard answer of the incorrectly-answered question, and storing the acquired standard answer in the incorrectly-answered question database and associating the acquired standard answer with the incorrectly-answered question.

Optionally, the method further includes selecting a question with the same or similar assessment knowledge point from the incorrectly-answered question database for pushing according to the assessment knowledge point corresponding to the incorrectly-answered questions.

Optionally, the method further includes recognizing at least one of a student number and a name and a class of a student in the marked test paper. Storing the region of the incorrectly-answered question in the incorrectly-answered question database to generate the collection of incorrectly-answered questions includes storing the region of the incorrectly-answered question in the incorrectly-answered question database and is associated with at least one of the recognized student number and name and class to create the collection of incorrectly-answered questions of the student.

In order to achieve the objective, the disclosure also provides a device for generating a collection of incorrectly-answered questions. The device includes: an acquiring module, used to acquire an image of a marked test paper; a first recognition module, used to recognize regions of respective questions in the marked test paper according to a pre-trained first region recognition model; a second recognition module, used to recognize a question whose marking result is incorrect in the marked test paper as an incorrectly-answered question according to a pre-trained incorrectly-answered question recognition model; and a generating module, used to store the region of the incorrectly-answered question in the incorrectly-answered question database to generate the collection of incorrectly-answered questions.

Optionally, the second recognition module is specifically used to recognize marking symbols in the regions of respective questions according to the pre-trained incorrectly-answered question recognition model, and determine a question whose marking symbol is a preset symbol as the question whose marking result is incorrect.

Optionally, the second recognition module recognizes the marking symbols in the regions of respective questions, specifically as follows. Binarization processing is performed on images corresponding to the regions of respective questions, and the marking symbols in the regions of respective questions are recognized according to a pixel value range obtained by the binarization processing.

Optionally, the device further includes a third recognition module, used to recognize an answer region and/or a marking region of the incorrectly-answered question according to a pre-trained second region recognition model, wherein the generating module is specifically used to perform covering processing on the answer region and/or the marking region of the incorrectly-answered question, and store the region of the incorrectly-answered question after the covering processing in the incorrectly-answered question database.

Optionally, the device further includes a first association module, used to recognize a character in the answer region of the incorrectly-answered question according to a pre-trained character recognition model, and store a recognized incorrect answer in the incorrectly-answered question database and associate the same with the incorrectly-answered question.

Optionally, the device further includes a second association module, used to store at least one of a test paper ID, a reason for being incorrect, and an assessment knowledge point corresponding to the incorrectly-answered question in the incorrectly-answered question database and associate the same with the incorrectly-answered question.

Optionally, the generating module is specifically used to recognize a question type of the incorrectly-answered question, and store the region of the incorrectly-answered question in a corresponding question type group in the incorrectly-answered question database.

Optionally, the device further includes a third association module, used to search for a question corresponding to the incorrectly-answered question in a question bank, acquire a standard answer of the incorrectly-answered question, and store the acquired standard answer in the incorrectly-answered question database and associate the same with the incorrectly-answered question.

Optionally, the device further includes a pushing module, used to select a question with the same or similar assessment knowledge point from the incorrectly-answered question database for pushing according to the assessment knowledge point corresponding to the incorrectly-answered question.

Optionally, the device further includes a fourth recognition module, used to recognize at least one of a student number and a name and a class of a student in the marked test paper, wherein the generating module is specifically used to store the region of the incorrectly-answered question in the incorrectly-answered question database and associate the region with at least one of the recognized student number and name and class to create the collection of incorrectly-answered questions of the student.

To achieve the above objective, the disclosure also provides an electronic apparatus, which includes a processor, a communication interface, a memory, and a communication bus. The processor, the communication interface, and the memory communicate with one another through the communication bus, wherein the memory is used to store a computer program, the processor is used to implement the method for generating the collection of incorrectly-answered questions according to any one of the above when executing the computer program stored in the memory.

In order to achieve the above objective, the disclosure also provides a computer-readable storage medium. The computer-readable storage medium is stored with a computer program. The method for generating the collection of incorrectly-answered questions according to any one of the above is implemented when the computer program is executed by a processor.

Compared with the prior art, in the disclosure, after acquiring the image of the marked test paper the regions of respective questions in the marked test paper are recognized according to the pre-trained first region recognition model. Then, the question whose marking result is incorrect in the marked test paper is recognized as the incorrectly-answered question according to the pre-trained incorrectly-answered question recognition model. Then, the region of the incorrectly-answered question is stored in the incorrectly-answered question database, thereby generating the collection of incorrectly-answered questions. By applying the solution of the disclosure, the collection of incorrectly-answered questions may be automatically generated according to the incorrectly-answered question in the test paper of the student, so that the student does not need to spend time and energy on manually copying the incorrectly-answered question, which improves the efficiency of generating the collection of incorrectly-answered questions and reduces the burden of the student.

DETAILED DESCRIPTION OF DISCLOSED EMBODIMENTS

A method and a device for generating a collection of incorrectly-answered questions, an electronic apparatus, and a computer-readable storage medium provided by the disclosure will be described in further detail below in conjunction with the accompanying drawings and specific embodiments. According to the claims and the following description, the advantages and features of the disclosure will be clearer. It should be noted that the drawings all adopt very simplified forms and all use imprecise proportions, which are only used to conveniently and clearly assist in explaining the objective of the embodiments of the disclosure.

In order to solve the problem in the prior art, a method and a device for generating a collection of incorrectly-answered questions, an electronic apparatus, and a computer-readable storage medium are provided according to the embodiments of the disclosure.

It should be noted that the method for generating the collection of incorrectly-answered questions of the embodiment of the disclosure may be applied to the device for generating the collection of incorrectly-answered questions of the embodiment of the disclosure, and the device for generating the collection of incorrectly-answered questions may be configured on the electronic apparatus. The electronic apparatus may be a personal computer, a mobile terminal, etc. The mobile terminal may be a hardware apparatus with various operating systems such as a mobile phone or a tablet computer.

Figure 1:
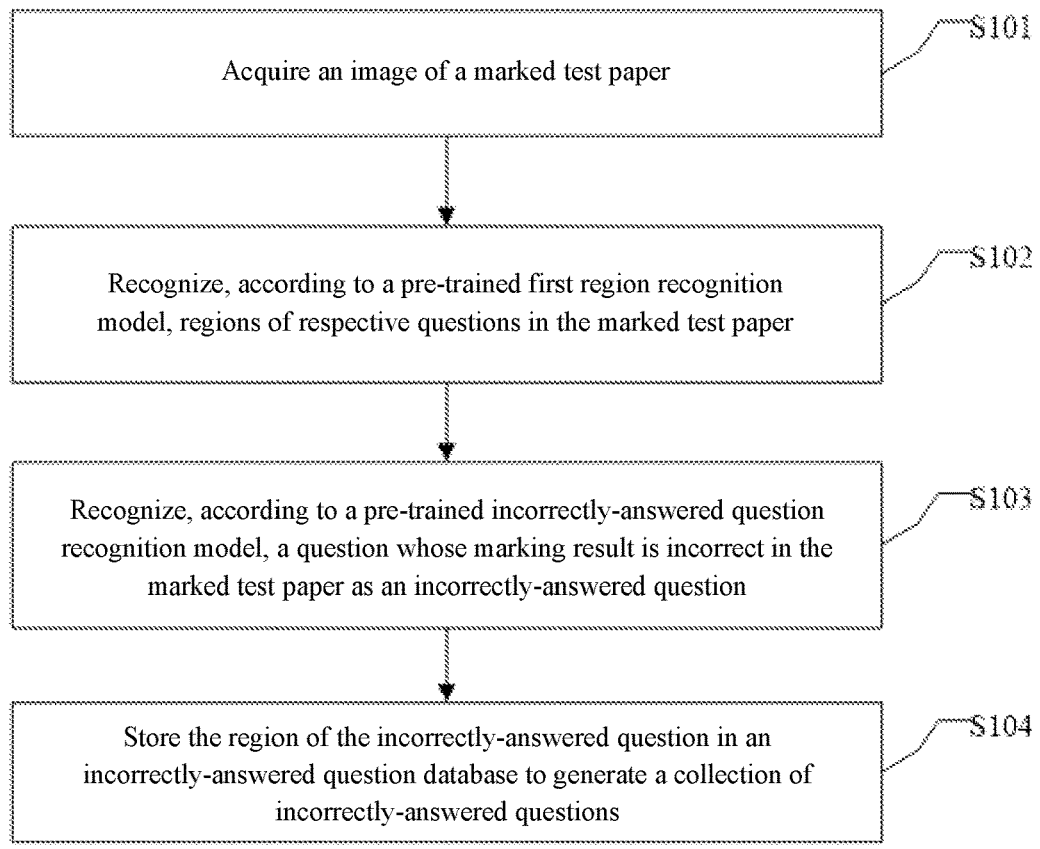
FIG. 1 is a schematic flowchart of a method for generating a collection of incorrectly-answered questions according to an embodiment of the disclosure.

FIG. 1 is a schematic flowchart of a method for generating a collection of incorrectly-answered questions according to an embodiment of the disclosure. Please refer to FIG. 1. The method for generating the collection of incorrectly-answered questions may include the following steps.

In Step S101, an image of a marked test paper is acquired.

The marked test paper may be a test paper that has been manually marked by a teacher or a test paper that has been automatically marked by a computer apparatus. The image of the marked test paper may be acquired by taking picture through a terminal apparatus such as a mobile phone or may be acquired by scanning through a printer.

In Step S102, regions of respective questions in the marked test paper are recognized according to a pre-trained first region recognition model.

The first region recognition model may be a model based on a neural network and may be obtained by, for example, training samples in a test paper sample training set based on a deep convolutional neural network (CNN). The trained first region recognition model is used to extract a two-dimensional feature vector from the image of the marked test paper. Anchor points with different shapes are generated in each grid of the two-dimensional feature vector. Ground truth boxes are used to label the recognized regions of respective questions. Regression processing may be performed on the ground truth boxes and the generated anchor points, so that the ground truth boxes are closer to actual positions of the questions. After recognizing question regions, each question may be cut into a single image or may not be actually cut, and each question region is divided into a single image of the region for processing during processing. Sorting is performed according to question position information.

In Step S103, a question whose marking result is incorrect in the marked test paper is recognized as an incorrectly-answered question according to a pre-trained incorrectly-answered question recognition model.

In an implementation, marking symbols in the regions of respective questions may be recognized according to the pre-trained incorrectly-answered question recognition model, and a question whose marking symbol is a preset symbol is determined as the question whose marking result is incorrect. It is understandable that the marking symbols for questions with correct and incorrect answers in the marked test papers are different. For example, the marking symbol for the question with correct answer may be " " and the marking symbol for the questions with incorrect answer may be "x", that is, the marking symbols include " " and "x", and the preset symbol is "x". Therefore, through recognizing the marking symbol in the question region, the question whose marking result is incorrect in the test paper may be recognized, that is, the incorrectly-answered question may be recognized. Specifically, the pre-trained incorrectly-answered question recognition model may be a model based on a neural network. The neural network model may be trained through extracting a large number of features of the marking symbols to create the incorrectly-answered question recognition model. For the specific training method of the incorrectly-answered question recognition model, reference may be made to the training method of a neural network model in the prior art, which will not be repeated here.

Further, recognizing the marking symbols in the regions of respective questions may specifically include: performing binarization processing on images corresponding to the regions of respective questions, and recognizing the marking symbols in the regions of respective questions according to a pixel value range. It is understandable that the answer to a true or false question may be represented by " " and "x". At this time, if the marking symbol of a question is also " " and "x", a recognition result of the incorrectly-answered question recognition model will be affected. At present, when marking test papers, a teacher usually uses a pen with specific color such as red (which is different from the color of pens used by students in answering) for marking. Therefore, the marking symbol is recognized by performing the binarization processing on the image corresponding to the question region and judging a region where marking handwriting is in red or other colors according to the pixel value range, which may prevent the incorrectly-answered question recognition model from misrecognizing the answer of a student as the marking symbol.

In Step S104, the region of the incorrectly-answered question is stored in a incorrectly-answered question database to generate the collection of incorrectly-answered questions.

In an implementation, the question region of the incorrectly-answered question recognized in Step S102 may be directly stored in the incorrectly-answered question database. In another implementation, a handwritten answer part and/or a marking symbol part in the question region of the incorrectly-answered question may also be removed, and only a stem region of the incorrectly-answered question is stored in the incorrectly-answered question database. Specifically, before executing Step S104, an answer region and/or a marking region of the incorrectly-answered question are recognized according to a pre-trained second region recognition model while recognizing a question stem or a picture region. At this time, in Step S104, storing the region of the incorrectly-answered question in the incorrectly-answered question database may specifically include: performing covering processing on the answer region and/or the marking region of the incorrectly-answered question, and storing the region of the incorrectly-answered question after the covering processing in the incorrectly-answered question database. The covering processing may include: adopting background color coverage, white coverage, mosaic, blur processing, or other processing manners on the answer region and/or the marking region. The second region recognition model may be a model based on a neural network. For the specific training method of the second region recognition model, reference may be made to the training method of a neural network model in the prior art, which will not be repeated here.

Further, it is also possible to recognize a character in the answer region of the incorrectly-answered question according to a pre-trained character recognition model, and store a recognized incorrect answer in the incorrectly-answered question database and associate the recognized incorrect answer with the incorrectly-answered question. The character recognition model may be trained based on the characters of handwritten fonts, and the character recognition model may be created based on a hole convolution and an attention model. Specifically, the hole convolution is adopted to extract features of the answer region. Then, the extracted features are decoded into characters through the attention model.

Further, a test paper identifier (ID), a reason for being incorrect, and/or an assessment knowledge point corresponding to the incorrectly-answered question may also be stored in the incorrectly-answered question database and associated with the incorrectly-answered question to facilitate viewing. The reason for being incorrect may include an incorrect calculation equation, an incorrect calculation process, an incorrect calculation result, an incorrect unit, etc. Specifically, the reason for being incorrect may be determined through recognizing the character in the answer region of the incorrectly-answered question and comparing a solving process listed in the answer region with a standard answer, or the reason for being incorrect may also be entered manually. The assessment knowledge point may include oral arithmetic, recursion equation calculation, unit conversion, four fundamental operations, quadratic equations in one variable, and other subdivided knowledge points. Specifically, the overall knowledge points may be pre-classified according to the syllabus, and the corresponding assessment knowledge point may be determined through recognizing stem character content of the incorrectly-answered questions. Alternatively, a question corresponding to a certain incorrectly-answered question in a question bank may be queried, and an assessment knowledge point category pre-labelled on the corresponding question is determined as an assessment knowledge point category of the incorrectly-answered question.

In addition, the incorrectly-answered question may also be classified and stored according to a question type. Specifically, when storing the region of the incorrectly-answered question in the incorrectly-answered question database, the question type of the incorrectly-answered question is recognized, and the region of the incorrectly-answered question is stored in a corresponding question type group in the incorrectly-answered question database. The question types may include oral arithmetic questions, fill-in-the-blank questions, true or false questions, application questions, etc. Specifically, a question corresponding to a certain incorrectly-answered question in the question bank may be queried, and the question type pre-labelled on the corresponding question is determined as the question type of the incorrectly-answered question. Alternatively, the question type of the incorrectly-answered question may be recognized through a pre-trained classification and recognition model.

Further, it is also possible to search for the question corresponding to the incorrectly-answered question in the question bank to acquire the standard answer of the incorrectly-answered question, and store the acquired standard answer in the incorrectly-answered question database and associate the acquired standard answer with the incorrectly-answered question. The standard answer and the incorrectly-answered question are correspondingly stored to facilitate subsequent review. Specifically, feature vectors of respective questions of the test paper where the incorrectly-answered question is in may be extracted. The corresponding test paper may be searched in the question bank according to the feature vector, and the question corresponding to the incorrectly-answered question may be determined from the corresponding test paper or the corresponding question is directly searched in the question bank according to the feature vector of the incorrectly-answered question.

Further, a question with the same or similar assessment knowledge point may be selected from the incorrectly-answered question database for pushing according to the assessment knowledge point corresponding to the incorrectly-answered question, so that the student may practice the assessment knowledge point. Here, having the same assessment knowledge point refers to that the questions belong to the same assessment knowledge point, for example, the same assessment knowledge point of unit conversion; and having similar assessment knowledge points refers to that the questions belong to different assessment knowledge points, but the two assessment knowledge points are very similar, which may be pre-determined according to the syllabus or experience of the teacher, for example, oral arithmetic and recursion equation calculation may be considered as belonging to similar assessment knowledge points. Therefore, if the assessment knowledge point corresponding to the incorrectly-answered question belong to oral arithmetic, the question whose assessment knowledge point belongs to recursion equation calculation may also be pushed during pushing. Specifically, when storing the recognized incorrectly-answered question in the incorrectly-answered question database, the assessment knowledge points corresponding to respective incorrectly-answered questions may be labeled, so that when storing a certain incorrectly-answered question, a similar incorrectly-answered question may be selected from the incorrectly-answered question database for pushing according to the knowledge point corresponding to the incorrectly-answered question.

In practical applications, the marked test paper may also contain student information such as a student number and/or a name and a class. The collections of incorrectly-answered questions for respective students may be created based on the student information, so that respective students may perform targeted learning. Specifically, the method may also recognize the student number and/or the name and the class of the student in the marked test paper. In Step S104, storing the region of the incorrectly-answered question in the incorrectly-answered question database to generate the collection of incorrectly-answered questions may include: storing the region of the incorrectly-answered question in the incorrectly-answered question database and associating the region of the incorrectly-answered question with the recognized student number and/or name and class to create the collection of incorrectly-answered questions of the student.

Compared with the prior art, in the disclosure, after acquiring the image of the marked test paper, the regions of respective questions in the marked test paper are recognized according to the pre-trained first region recognition model. Then, the question whose marking result is incorrect in the marked test paper is recognized as the incorrectly-answered question according to the pre-trained incorrectly-answered question recognition model. Then, the region of the incorrectly-answered question is stored in the incorrectly-answered question database, thereby generating the collection of incorrectly-answered questions. By applying the solution of the disclosure, the collection of incorrectly-answered questions may be automatically generated according to the incorrectly-answered question in the test paper of the student, so that the student does not need to spend time and energy on manually copying the incorrectly-answered question, which improves the efficiency of generating the collection of incorrectly-answered questions and reduces the burden of the student.

Figure 2:
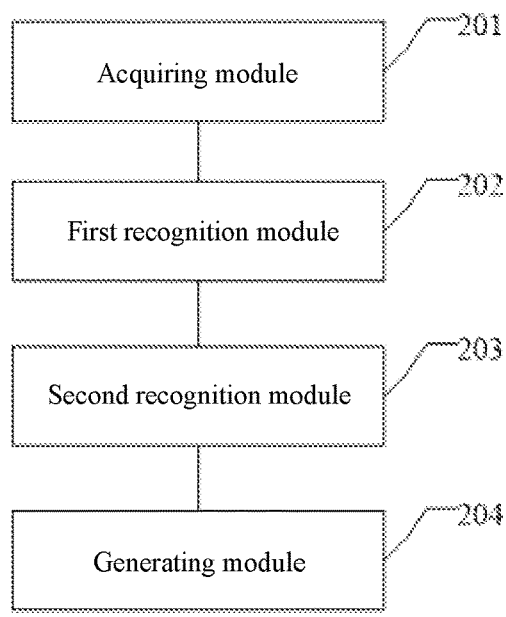
FIG. 2 is a schematic structural diagram of a device for generating a collection of incorrectly-answered questions according to an embodiment of the disclosure.

Corresponding to the embodiment of the method for generating the collection of incorrectly-answered questions, the disclosure provides a device for generating a collection of incorrectly-answered questions. Referring to FIG. 2, the device may include the following.

An acquiring module 201 is used to acquire an image of a marked test paper.

A first recognition module 202 is used to recognize, regions of respective questions in the marked test paper according to a pre-trained first region recognition model.

A second recognition module 203 is used to recognize, a question whose marking result is incorrect in the marked test paper as an incorrectly-answered question according to a pre-trained incorrectly-answered question recognition model.

A generating module 204 is used to store the region of the incorrectly-answered question in the incorrectly-answered question database to generate the collection of incorrectly-answered questions.

Optionally, the second recognition module 203 is specifically used to recognize, marking symbols in the regions of respective questions according to the pre-trained incorrectly-answered question recognition model, and determine a question whose marking symbol is a preset symbol as the question whose marking result is incorrect.

Optionally, the second recognition module 203 recognizes the marking symbols in the regions of respective questions, specifically as follows. Binarization processing is performed on images corresponding to the regions of respective questions, and the marking symbols in the regions of respective questions are recognized according to a pixel value range.

Optionally, the device further includes a third recognition module which is used to recognize, an answer region and/or a marking region of the incorrectly-answered question according to a pre-trained second region recognition model.

The generating module 204 is specifically used to perform covering processing on the answer region and/or the marking region of the incorrectly-answered question, and store the region of the incorrectly-answered question after the covering processing in the incorrectly-answered question database.

Optionally, the device further includes the following.

A first association module is used to recognize, a character in the answer region of the incorrectly-answered question according to a pre-trained character recognition model, and store a recognized incorrect answer in the incorrectly-answered question database and associate the recognized incorrect answer with the incorrectly-answered question.

Optionally, the device further includes the following.

A second association module is used to store a test paper ID, a reason for being incorrect, and/or an assessment knowledge point corresponding to the incorrectly-answered question in the incorrectly-answered question database and associate the test paper ID, the reason for being incorrect, and/or the assessment knowledge point with the incorrectly-answered question.

Optionally, the generating module 204 is specifically used to recognize a question type of the incorrectly-answered question, and store the region of the incorrectly-answered question in a corresponding question type group in the incorrectly-answered question database.

Optionally, the device further includes the following.

A third association module is used to search for a question corresponding to the incorrectly-answered question in a question bank, acquire a standard answer of the incorrectly-answered question, and store the acquired standard answer in the incorrectly-answered question database and associate the acquired standard answer with the incorrectly-answered question.

Optionally, the device further includes the following.

A pushing module is used to select, a question with the same or similar assessment knowledge point from the incorrectly-answered question database for pushing according to the assessment knowledge point corresponding to the incorrectly-answered question.

Optionally, the device further includes the following.

A fourth recognition module is used to recognize a student number and/or a name and a class of a student in the marked test paper.

The generating module 204 is specifically used to store the region of the incorrectly-answered question in the incorrectly-answered question database and associate the region with the recognized student number and/or name and class to create the collection of incorrectly-answered questions of the student.

Figure 3:
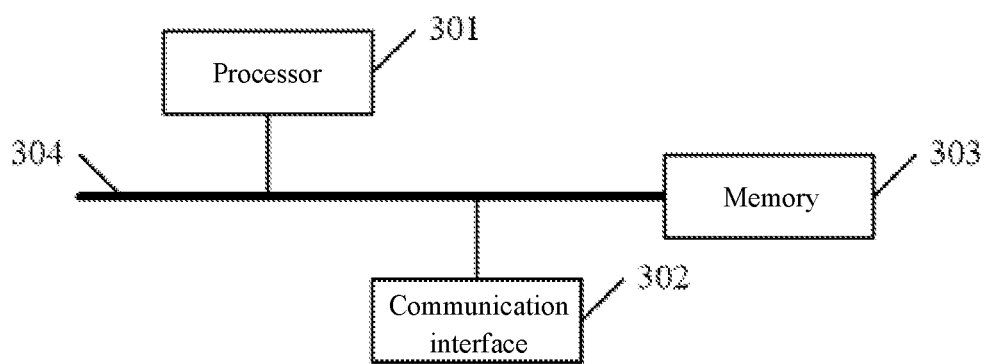
FIG. 3 is a schematic structural diagram of an electronic apparatus according to an embodiment of the disclosure.

The disclosure also provides an electronic apparatus, as shown in FIG. 3. The electronic apparatus includes a processor 301, a communication interface 302, a memory 303, and a communication bus 304. The processor 301, the communication interface 302, and the memory 303 communicate with one another through the communication bus 304.

The memory 303 is used to store a computer program.

The processor 301 is used to implement the following steps when executing the program stored in the memory 303.

An image of a marked test paper is acquired.

According to a pre-trained first region recognition model, regions of respective questions in the marked test paper are recognized.

According to a pre-trained incorrectly-answered question recognition model, a question whose marking result is incorrect in the marked test paper is recognized as an incorrectly-answered question.

The region of the incorrectly-answered question is stored in an incorrectly-answered question database to generate a collection of incorrectly-answered questions.

For the specific implementation and relevant explanation content of each step of the method, reference may be made to the embodiment of the method shown in FIG. 1, which will not be repeated here.

In addition, other implementations of the method for generating the collection of incorrectly-answered questions implemented by the processor 301 executing the program stored in the memory 303 are the same as the implementations mentioned in the embodiment of the method, which will not be repeated here.

The communication bus in the electronic apparatus mentioned above may be a peripheral component interconnect (PCI) bus, an extended industry standard architecture (EISA) bus, etc. The communication bus may be divided into an address bus, a data bus, a control bus, etc. For ease of representation, the communication bus is represented by only one thick line in the drawing, but it does not mean that there is only one bus or one type of bus.

The communication interface is used for communication between the electronic apparatus and other apparatuses.

The memory may include a random access memory (RAM) and may also include a non-volatile memory (NVM), such as at least one disk memory. Optionally, the memory may also be at least one storage device located away from the processor.

The processor may be a general processor, which includes a central processing unit (CPU), a network processor (NP), etc.; and may also be a digital signal processor (DSP), an application specific integrated circuit (ASIC), a field-programmable gate array (FPGA), or other programmable logic devices, discrete gate or transistor logic devices, or discrete hardware components.

The disclosure also provides a computer-readable storage medium. The computer-readable storage medium is stored with a computer program. The steps of the method for generating the collection of incorrectly-answered questions according to the above is implemented when the computer program is executed by a processor.

It should be noted that respective embodiments in the specification are described by adopting a relevant manner. The same or similar parts between respective embodiments may be cross-referenced. Each embodiment focuses on the differences from other embodiments. In particular, since the embodiments of the device, the electronic apparatus, and the computer-readable storage medium are basically similar to the embodiment of the method, the description is relatively simple and reference may be made to partial description of the embodiment of the method for relevant parts.

In the disclosure, relational terms such as first and second are only used to distinguish one entity or operation from another entity or operation and do not necessarily require or imply any such actual relationship or order between the entities or operations. Moreover, the terms "include", "contain", or any other variants thereof are intended to cover non-exclusive inclusion, so that a process, a method, an article, or an apparatus including a series of elements not only includes the elements, but also includes other elements not explicitly listed or includes elements inherent to the process, the method, the article, or the apparatus. If there are no more restrictions, an element defined by the sentence "including a . . . " does not exclude the existence of other same elements in the process, the method, the article, or the apparatus including the element.

The foregoing description is only a description of the preferred embodiments of the disclosure and does not limit the scope of the disclosure in any way. Any change or modification made by persons skilled in the art of the disclosure according to the disclosed content shall fall within the protection scope of the claims.

What is claimed is:

1. A method for generating a collection of incorrectly-answered questions, comprising:
   acquiring an image of a marked test paper;
   recognizing regions of respective questions in the marked test paper according to a pre-trained first region recognition model;
   recognizing a question whose marking result is incorrect in the marked test paper as an incorrectly-answered question according to a pre-trained incorrectly-answered question recognition model; and
   storing the region of the incorrectly-answered question in an incorrectly-answered question database to generate the collection of incorrectly-answered questions,
   wherein recognizing the question whose marking result is incorrect in the marked test paper as the incorrectly-answered question according to the pre-trained incorrectly-answered question recognition model comprises:
   recognizing marking symbols in the regions of respective questions according to the pre-trained incorrectly-answered question recognition model, and determining a question whose marking symbol is a preset symbol as the question whose marking result is incorrect,
   recognizing the marking symbols in the regions of respective questions comprises: performing binarization processing on images corresponding to the regions of respective questions, and recognizing the marking symbols in the regions of respective questions according to a pixel value range,
   the method further comprises:
   storing a test paper identifier (ID), a reason for being incorrect, and an assessment knowledge point corresponding to the incorrectly-answered question in the incorrectly-answered question database and associating the test paper ID, the reason for being incorrect, and the assessment knowledge point with the incorrectly-answered question,
   the reason for being incorrect is obtained through following process:
   determining the reason for being incorrect through recognizing a character in an answer region of the incorrectly-answered question and comparing a solving process listed in the answer region with a standard answer,
   the assessment knowledge point is obtained through following process:
   pre-classifying overall knowledge points according to a syllabus, and determining the corresponding assessment knowledge point through recognizing stem character content of the incorrectly-answered question, or
   searching a question corresponding to the incorrectly-answered question in a question bank and determining an assessment knowledge point category pre-labelled on the corresponding question is as an assessment knowledge point category of the incorrectly-answered question.

2. The method for generating the collection of incorrectly-answered questions according to claim 1, further comprising:
   recognizing at least one of an answer region and a marking region of the incorrectly-answered question according to a pre-trained second region recognition model;
   wherein storing the region of the incorrectly-answered question in the incorrectly-answered question database comprises:
   performing covering processing on at least one of the answer region and the marking region of the incorrectly-answered question, and storing the region of the incorrectly-answered question after the covering processing in the incorrectly-answered question database.

3. The method for generating the collection of incorrectly-answered questions according to claim 2, further comprising:
   recognizing a character in the answer region of the incorrectly-answered question according to a pre-trained character recognition model, and storing a recognized incorrect answer in the incorrectly-answered question database and associating the recognized incorrect answer with the incorrectly-answered question.

4. The method for generating the collection of incorrectly-answered questions according to claim 1,
   wherein storing the region of the incorrectly-answered question in the incorrectly-answered question database comprises:
   storing the region of the incorrectly-answered question in a corresponding question type group in the incorrectly-answered question database.

5. The method for generating the collection of incorrectly-answered questions according to claim 1, further comprising searching the question corresponding to the incorrectly-answered question in the question bank to acquire a standard answer of the incorrectly-answered question, and storing the acquired standard answer in the incorrectly-answered question database and associating the acquired standard answer with the incorrectly-answered question.

6. The method for generating the collection of incorrectly-answered questions according to claim 1, further comprising:
selecting a question with the same or similar assessment knowledge point from the incorrectly-answered question database for pushing according to an assessment knowledge point corresponding to the incorrectly-answered question.

7. The method for generating the collection of incorrectly-answered questions according to claim 1, further comprising:
recognizing at least one of a student number and a name and a class of a student in the marked test paper;
wherein storing the region of the incorrectly-answered question in the incorrectly-answered question database to generate the collection of incorrectly-answered questions comprises:
storing the region of the incorrectly-answered question in the incorrectly-answered question database and associating the region with at least one of the recognized student number and name and class to create the collection of incorrectly-answered questions of the student.

8. A device for generating a collection of incorrectly-answered questions, characterized by comprising:
a memory, configured to store an acquiring module, a first recognition module, a second recognition module and a generating module; and
a processor, coupled to the memory and configured to execute the acquiring module, the first recognition module, the second recognition module and the generating module,
wherein the acquiring module is used to acquire an image of a marked test paper;
the first recognition module is used to recognize regions of respective questions in the marked test paper according to a pre-trained first region recognition model;
the second recognition module is used to recognize a question whose marking result is incorrect in the marked test paper as an incorrectly-answered question according to a pre-trained incorrectly-answered question recognition model; and
the generating module is used to store the region of the incorrectly-answered question in an incorrectly-answered question database to generate the collection of incorrectly-answered questions,
wherein the second recognition module is used to: recognize marking symbols in the regions of respective questions according to the pre-trained incorrectly-answered question recognition model, and determine a question whose marking symbol is a preset symbol as the question whose marking result is incorrect,
recognizing the marking symbols in the regions of respective questions comprises: performing binarization processing on images corresponding to the regions of respective questions, and recognizing the marking symbols in the regions of respective questions according to a pixel value range,
the device further comprises:
a second association module configured to store a test paper identifier (ID), a reason for being incorrect, and an assessment knowledge point corresponding to the incorrectly-answered question in the incorrectly-answered question database and associate the test paper ID, the reason for being incorrect, and the assessment knowledge point with the incorrectly-answered question,
the reason for being incorrect is obtained through following process:
determining the reason for being incorrect through recognizing a character in an answer region of the incorrectly-answered question and comparing a solving process listed in the answer region with a standard answer,
the assessment knowledge point is obtained through following process:
pre-classifying overall knowledge points according to a syllabus, and determining the corresponding assessment knowledge point through recognizing stem character content of the incorrectly-answered question, or
searching a question corresponding to the incorrectly-answered question in a question bank and determining an assessment knowledge point category pre-labelled on the corresponding question is as an assessment knowledge point category of the incorrectly-answered question.

9. The device for generating the collection of incorrectly-answered questions according to claim 8, wherein the memory further comprises:
a third recognition module,
the processor is configured to execute the third recognition module used to recognize at least one of an answer region and a marking region of the incorrectly-answered question according to a pre-trained second region recognition model;
wherein the generating module is used to:
perform covering processing on at least one of the answer region and the marking region of the incorrectly-answered question, and store the region of the incorrectly-answered question after the covering processing in the incorrectly-answered question database.

10. An electronic apparatus, characterized by comprising a processor, a communication interface, a memory, and a communication bus, wherein the processor, the communication interface, and the memory communicate with one another through the communication bus;
the memory is used to store a computer program; and
the processor is configured to perform the method according to claim 1 when executing the computer program stored in the memory.

11. A non-transitory computer-readable storage medium, characterized in that the computer-readable storage medium is stored with a computer program, and the method according to claim 1 is implemented when the computer program is executed by a processor.

* * * * *